Nov. 10, 1970   L. C. SHURTLEFF ET AL   3,538,587
APPARATUS FOR MAKING VALVES

Original Filed April 11, 1966   2 Sheets-Sheet 1

INVENTORS.
LOUIS CHARLES SHURTLEFF
O O SHURTLEFF

BY *Brown, Critchlow, Flick & Peckham*
ATTORNEYS.

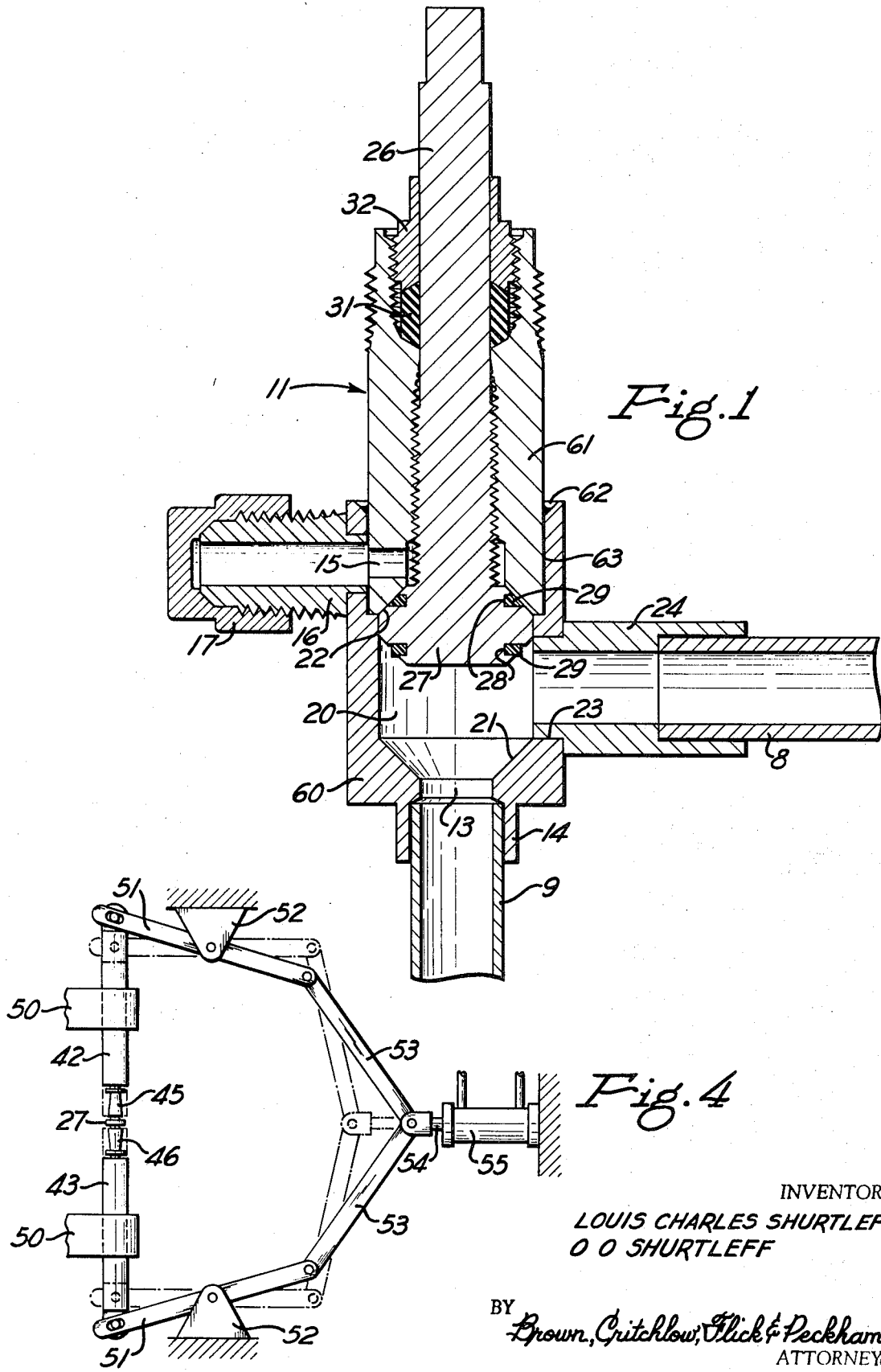

United States Patent Office 3,538,587
Patented Nov. 10, 1970

3,538,587
APPARATUS FOR MAKING VALVES
Louis Charles Shurtleff and O O Shurtleff, Austin, Tex., assignors, by mesne assignments, to "Automatic" Sprinkler Corporation of America, Cleveland, Ohio, a corporation
Continuation of application Ser. No. 541,687, Apr. 11, 1966. This application Mar. 21, 1968, Ser. No. 715,092
Int. Cl. B23p *19/02*
U.S. Cl. 29—235                            6 Claims

ABSTRACT OF THE DISCLOSURE

One or more tetrafluoroethylene resin sealing rings are simultaneously expanded and moved axially into annular grooves in a valve stem head by means of such a sudden impact that the rings are not permanently stretched but immediately contract into the grooves.

---

This application is a continuation of our copending patent application, Ser. No. 541,687, filed Apr. 11, 1966, now Pat. No. 3,382,894.

It is common practice to place in the refrigerant-conducting conduits of a refrigeration system one or more valves which, in normal operation of the system, allow the refrigerant to flow through them. They are not necessary for the functioning of the system and may never be touched, but they are in the nature of emergency valves that are used only in case the refrigeration system needs to be serviced. If they are needed only once, their cost is justified. They can be used to check the pressure in the system, to shut off parts of the system while other parts are repaired, and to replace refrigerant that has accidentally been lost from the system. On the other hand, a service valve that leaks while the refrigeration system is open for repairs is doubly expensive, in that the refrigerant that it was meant to save is lost, so the cost of the valve was not justified and the money wasted.

The most generally used service valve for a refrigeration system has a rotatable valve stem made of stainless steel, or machinable steel that has been plated. The head of the stem, which is the closure member, is ground and polished to eliminate all tool marks and surface irregularities. The valve body in which the steel stem is mounted is made of brass or steel and its seats must be perfectly formed. If the valve body is made of steel, grinding and polishing are necessary. In assembling the valve, parts of the body are welded together near a port where later one of the refrigeration conduits is welded to the body. Consequently, the welding material requires a very high temperature so that the purchaser of the valve can weld a conduit to the body without remelting the first weld. The metal-to-metal seating surfaces in such a valve rarely seal effectively. If the valve stem and head are made of machinable steel, they must then be plated to prevent corrosion. The high temperature used in welding the parts of the valve body together often burns the plating and thereby eliminates its protective properties. This eventually allows corrosion and results in a valve that becomes frozen in place and useless.

To overcome these problems it has been proposed that the valve be provided with nonmetallic softer seating surfaces, but this immediately raises two more problems. The most widely used refrigerants today are those which belong to the fluorocarbon group. There is only one nonmetal material accepted by the refrigeration industry that has the desired soft seat characteristic and yet is not attacked by such refrigerants. This material is tetrafluoroethylene resin, which is sold under the trademark Teflon by one of the companies that make it. For the sake of brevity, tetrafluoroethylene resin will be referred to in this specification as Teflon.

The use of Teflon brings about the second problem, which is that it is not easy to work with. Due to its characteristic semi-rigid state and the fact that it yields readily to pressures and deforms without fully returning to its original shape, it has always been thought of as a material which must be pre-cut to exact size and then used without abuse. Consequently, in making a refrigeration service valve with soft seats of Teflon, it has been necessary to assemble the valve stem and head from several parts in order to mount a pair of axially spaced sealing rings of Teflon in annular grooves in the stem head without first expanding the rings. However, such assemblies are undesirable because they are expensive to make and they do not offer great strength. That is, in use, the force applied to the valve stem in pressing the rings against their seats may loosen the head assembly. Furthermore, such an assembly does not lend itself to accuracy because each part of it carries its own chance for error and even may be bent during assembly. There also is an additional objection to such a valve, which is that Teflon will not stand high temperatures and therefore must be protected from the heat of the high temperature weld that joins the parts of the valve body together. Such a weld is made at temperatures between 1400 and 1600° F., while the temperature of the Teflon sealing rings must not exceed 500° F. It is very difficult to protect the rings from the destructive high temperatures.

It is among the objects of this invention to provide a method and apparatus for inserting tetrafluoroethylene resin sealing rings in a valve closure without stretching the rings out of shape permanently.

In accordance with this invention, joined to the front end of a valve stem is a one-piece head having a pair of axially spaced annular grooves therein provided with inner and outer radial side walls connected by circular inner end walls. Teflon sealing rings are mounted in the groove in engagement with their inner end walls, with the rings projecting radially from the grooves. In order to assemble the sealing rings with the stem head, the rings are disposed in axial alignment with the head and then are moved axially suddenly at high speed toward said grooves and are simultaneously expanded sufficiently to pass over the outer walls of the grooves. Immediately after they pass over these outer walls the rings are allowed to contract into the grooves, which they will do. This manner of assembling the rings with the head is made possible by our discovery that if the Teflon rings are expanded by subjecting them to suddent pressure or shock only momentarily, such as by an impact, they will return to their original size. If they are expanded more slowly, they will yield and not return to their original size.

The invention is illustrated in the accompanying drawings, in which

FIG. 1 is a longitudinal section through our refrigeration service valve;

FIG. 4 is a reduced fragmentary side view of said apparatus with its actuating means.

Figure 2:
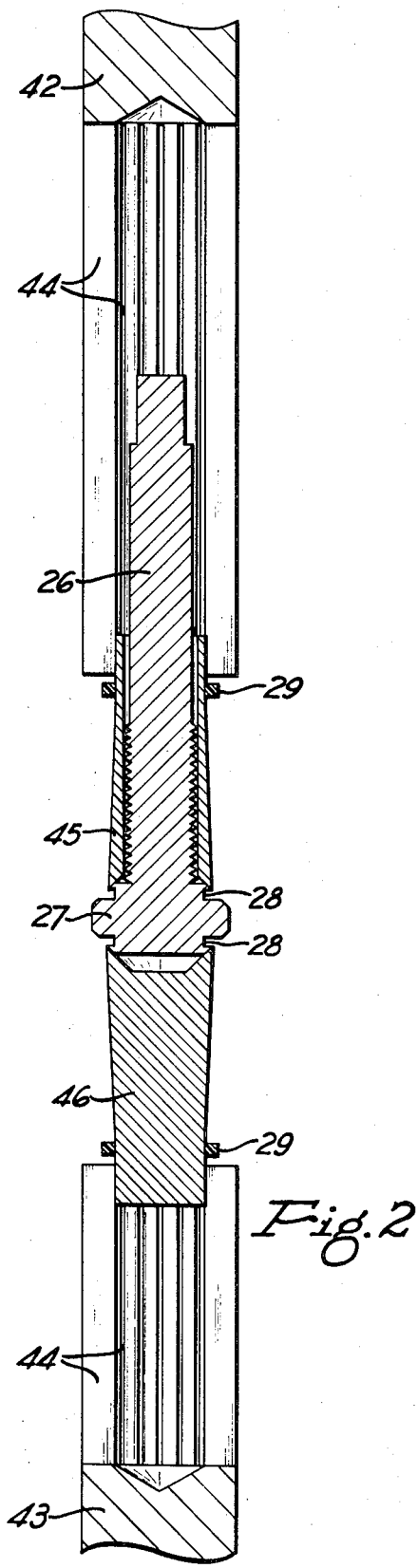
FIG. 2 is a longitudinal section through apparatus for assembly the sealing rings with the valve closure.

Referring to FIG. 1 of the drawings, a refrigeration service valve 11 has a tubular body provided at its front or lower end with an axial port 13, from which an intergral collar 14 projects. One end of conduit 9 is welded in this collar. Behind the end port the body of the valve is provided with a side port 15, from which a coupling 16 projects. A cap 17 is shown screwed onto this coupling to seal this port, but the cap can be removed to permit refrigerant to be added to a refrigeration system through the coupling, or the cap can be replaced by a pressure gauge if desired.

The inside of the valve body between the ports just described is enlarged to form a valve chamber 20 having at its front and rear ends tapered valve seats 21 and 22 that face each other between the two ports. The valve body also has a second side port 23 that opens into the valve chamber substantially midway between the two valve seats. A coupling 24 is rigidly mounted in this port and has an outer end in which conduit 8 is welded.

Threaded in the tubular body of the valve behind the rear valve seat is a rotatable valve stem 26 that projects from the rear end of the body and is provided with flats to permit it to be turned. Joined to the front end of the valve stem, preferably integrally, is a one-piece head 27 that is disposed in the valve chamber and forms the closure member. The head has a pair of axially spaced annular grooves 28 in it provided with inner and outer radial side walls connected by circular inner end walls. Mounted in these grooves are sealing rings 29 made of tetrafluoroethylene resin. It will be observed that the rings engage the circular inner end walls of the grooves and project from the grooves far enough to make good sealing contact with the valve seats. One of the rings engages the rear valve seat 22 when the stem head is moved to the back of the valve chamber as shown in FIG. 1, which is the normal operating position for the valve. The other ring is engageable with the front valve seat 21 to close the end port 13 when the head is moved forward in the chamber. A packing gland 31 in a recess in the rear end of the valve body is pressed tightly against the valve stem by a nut 32 screwed into the recess, whereby leakage rearwardly along the stem is prevented.

It is a feature of this invention that although the stem head 27 is made in one piece with the grooves 28 cut into it, the sealing rings fill the grooves in spite of the fact that they are made of tetrafluoroethylene resin. Heretofore, this had been considered to be impossible, due to the rings not contracting appreciably after they had been stretched far enough to pass over the outer side walls of the grooves in order to enter the grooves. In other words, the rings yielded and remain permanently stretched. The reason that our sealing rings of Teflon engage the circular inner end walls of the grooves in the one-piece head is that in assembling the rings with the head the rings were expanded by the shock of sudden pressure applied only for an instant like an impact, and during that instant they were slipped over the outer side walls of the grooves and released. We discovered that such shock or impact stretching of the rings for less than a second would not permanently deform them. Instead, they returned to their original size as soon as the expanding pressure was removed, thereby behaving like elastic rings. As far as we know, this is the first time that Teflon sealing rings have fit snugly in grooves in a one-piece valve closure, so such a construction is an important feature of this invention. Before this invention, as mentioned above, Teflon sealing rings were not stretched into place because, due to the time involved in expanding them, they yielded and would not contract after being expanded. Therefore, the valve closure had to be assembled from several separate parts.

Figure 3:
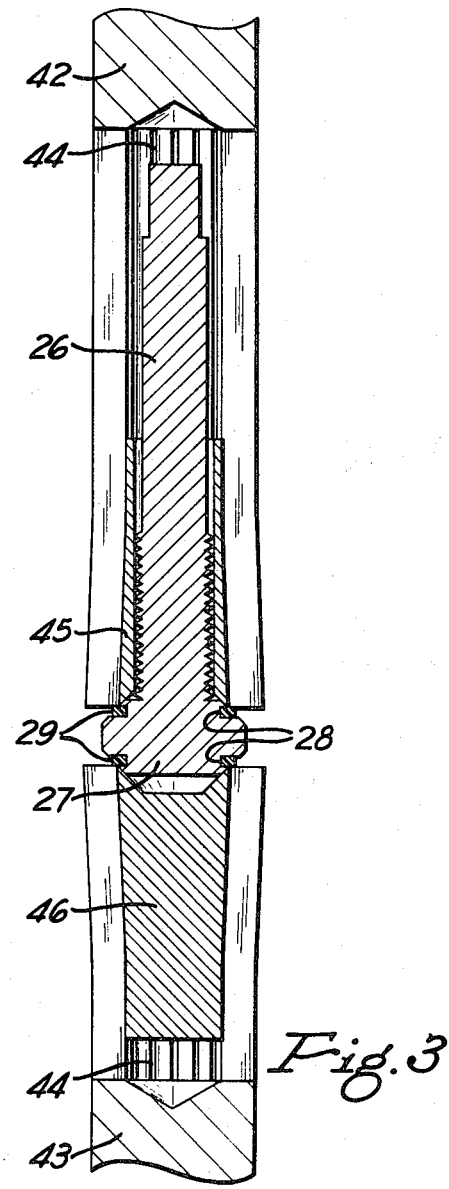
FIG. 3 is a similar view showing the rings just after they have snapped into the grooves in the closure.

In order to subject the sealing rings 29 to sudden pressure for an instant to expand them only momentarily in accordance with the present invention, apparatus such as shown in FIGS. 2, 3 and 4 may be used. This apparatus includes a pair of rams 42 and 43 that are axially aligned, with their inner ends spaced apart and expandable. The expansible portion of each ram is tubular and is provided with a plurality of longitudinally extending, circumferentially spaced slits 44. Between the rams there is a pair of rigid conical mandrels 45 and 46. Each of these mandrels normally has only its small end disposed in the inner end of one of the rams, as shown in FIG. 2. Preferably, the smaller end portions of the conical mandrels are cylindrical and are tightly gripped by the ends of the rams. Conical mandrels 45 is hollow for snugly receiving the valve stem 26, with its head 27 located between the adjacent large ends of the conical mandrels which engage its opposite sides. The large ends of the conical mandrels are recessed to receive the adjoining sides of the valve stem head for a short distance to help keep the conical mandrels and head aligned. The edge of the large end of each conical mandrel has a diameter substantially the same as the outer diameter of the outer side wall of the adjacent groove 28 in the stem head. The small ends of the conical mandrels are of a size to receive and preferably be snugly engaged by the two sealing rings 29 close to the adjoining rams.

Suitable means are provided for moving the rams toward each other extremely rapidly. When this is done, the rams push the two sealing rings toward each other, the rams expanding and sliding along the flaring surfaces of the conical mandrels as shown in FIG. 3. As the sealing rings are pushed toward the stem head, they are compelled by the conical mandrels to expand. Since this axial movement of the rings toward each other takes only an instant, it is the same as if the rings had been subjected to a sudden, momentarily applied expanding shock or impact. The movement of the rams toward each other stops just as they push the rings off the large ends of the conical mandrels and around the grooves. At that moment the expanding force disappears and the rings snap into the encircled grooves and contract into engagement with their circular inner end walls. If desired, the rings may be formed with inner diameters slightly less than the inner diameters of the grooves, so that when the rings contract into the grooves they will tightly grip the inner end walls of the grooves.

One way of moving the two rams toward each other very rapidly is illustrated in FIG. 4. The rams are shown slidably mounted in two fixed supports 50, with the outer ends of the rams pivotally connected to one end of levers 51, the central portions of which are pivotally mounted in stationary supports 52. The opposite end of these levers are pivotally connected to the outer ends of toggle links 53, the inner ends of which are pivoted to a piston rod 54 that extends into a fluid pressure cylinder 55. When fluid under pressure is suddenly admitted to the right-hand end of this cylinder, the toggle is straightened, which causes the levers to rock and force the rams toward each other.

A further feature of this invention is that the tubular body of the service valve is formed from two parts, a front portion 60 and a rear portion 61, which are welded together in a location so remote from collar 14 that there is no danger of the heat that later is applied in welding conduit 9 in the collar affecting the weld between the two parts of the valve body. Accordingly, the front portion of the valve body is provided at its rear end with a socket 62 that is located behind the side port 23 but is provided with the outer part of side port 15 in its side wall. The front end of the rear portion of the valve body fits in this socket and is welded therein. This weld is so far from collar 14 that a relatively low temperature (e.g. 600 to 800° F.) welding material 63 can be used without being affected by the heat used later in welding conduit 9 in collar 14. The temperature required for the welding material 63 is so low that there is little danger of the heat affecting the Teflon sealing rings in the valve stem head, which at that time would be moved forward against seat 21. Our construction of the valve body also makes it convenient to form the rear valve seat 22 on the front end of the rear portion 61 of the body.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. Apparatus for inserting a tetrafluoroethylene resin sealing ring in an annular groove in a valve stem head in which the groove has inner and outer radial side walls, said apparatus comprising a ram having an open expandable end, supporting means spaced axially from said open end, a hollow conical mandrel having its smaller end slidably mounted in the open end of the ram and gripped by it, the opposite end of the mandrel being spaced axially from said supporting means, the mandrel being adapted to snugly receive the valve stem with its head between the mandrel and said supporting means in engagement with both, the mandrel being adpated to be encircled near said ram by said sealing ring in engagement with the mandrel, and means for quickly moving the ram along the conical mandrel in engagement therewith toward said supporting means to rapidly force the ring toward the larger end of the mandrel to expand the ring thereon until it can snap into said groove.

2. Apparatus according to claim 1, in which said supporting means include a second expansible ram axially aligned with the first-mentioned ram, and a second conical mandrel having its smaller end slidably mounted in and gripped by the second ram and its larger end positioned to be engaged by the valve stem head, and the second conical mandrel being adapted to be encircled near the second ram by a second sealing ring for insertion in a second groove in said head when the first-mentioned ram is moved toward the second ram.

3. Apparatus according to claim 1, in which said supporting means include a second expansible ram axially aligned with the first-mentioned ram, and a second conical mandrel having its smaller end slidably mounted in and gripped by the second ram and its larger end positioned to be engaged by the valve stem head, and the second conical mandrel being adapted to be encircled near the second ram by a second sealing ring, said apparatus including means for moving said second ram toward the first-mentioned ram simultaneously with and at substantially the same speed as the movement of the first-mentioned ram to thereby insert the second ring in a second groove in said head.

4. Apparatus for inserting tetrafluoroethylene resin sealing rings in axially spaced annular grooves in a valve stem head in which the grooves have inner and outer radial side walls, said apparatus comprising a pair of spaced supports provided with axially aligned passages therethrough, a ram slidably mounted in each passage and having an inner end between said supports, the inner end portions of the ram being hollow and expansible, a pair of aligned conical mandrels between the rams, the smaller end of each mandrel being gripped in the hollow end of the adjoining ram and slidable axially thereof, one of the mandrels being hollow to snugly receive the valve stem with its head between the larger ends of the mandrel in engagement therewith, each mandrel being formed to be encircled near the adjoining ram with one of said sealing rings in engagement with the mandrel, and means connected with the outer ends of the rams for moving the rams rapidly toward each other along the mandrels to quickly force sealing rings thereon over the larger ends of the mandrels so that they can snap into said grooves.

5. Apparatus according to claim 4, in which said ram-moving means include a bracket beside each ram, a lever pivotally supported by each bracket and having an outer end pivotally connected to the outer end of the adjacent ram, and means for quickly forcing apart the inner ends of the levers.

6. Apparatus according to claim 4, in which said ram-moving means include a bracket beside each ram, a lever pivotally supported by each bracket and having an outer end pivotally connected to the outer end of the adjacent ram, a normally angled toggle pivotally connected to the inner ends of the links, and fluid pressure operated means for straightening the toggle.

References Cited

UNITED STATES PATENTS

| | | | |
|---|---|---|---|
| 2,429,341 | 10/1947 | Ballagh | 29—236 |
| 2,807,078 | 9/1957 | Erdmann | 29—229 |
| 2,814,858 | 12/1957 | Erdmann | 29—229 |
| 2,968,864 | 1/1961 | Lee | 29—235 |
| 3,319,325 | 5/1967 | Nessamar et al. | 29—235 |
| 3,377,691 | 4/1968 | Kasper et al. | 29—213 |

JOHN F. CAMPBELL, Primary Examiner

V. A. DiPALMA, Assistant Examiner

U.S. Cl. X.R.

29—213, 229, 236